April 18, 1967  J. R. YOUNG  3,314,482
VALVE CONTROL MECHANISMS AND TECHNIQUES
Filed April 9, 1964  4 Sheets-Sheet 1
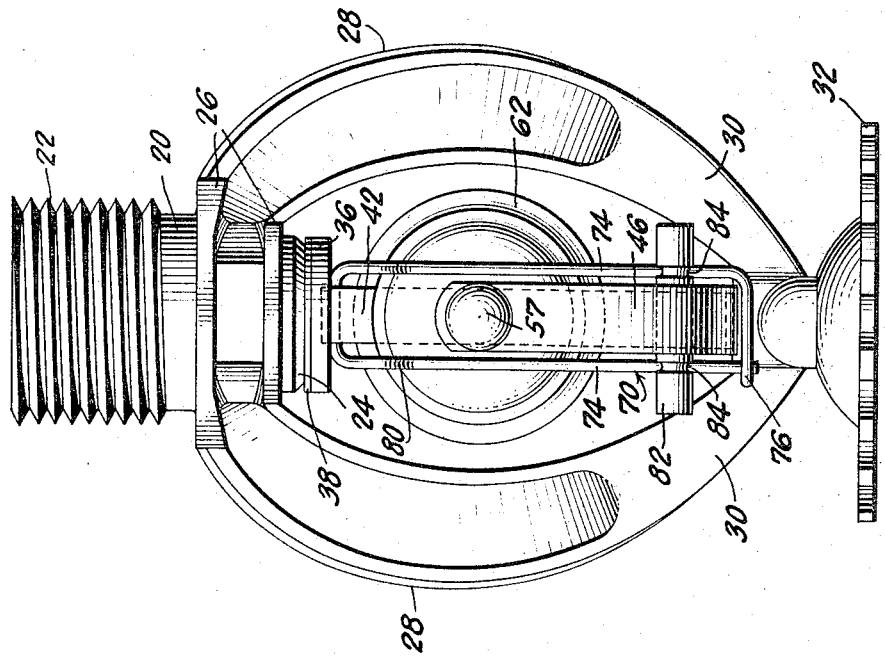
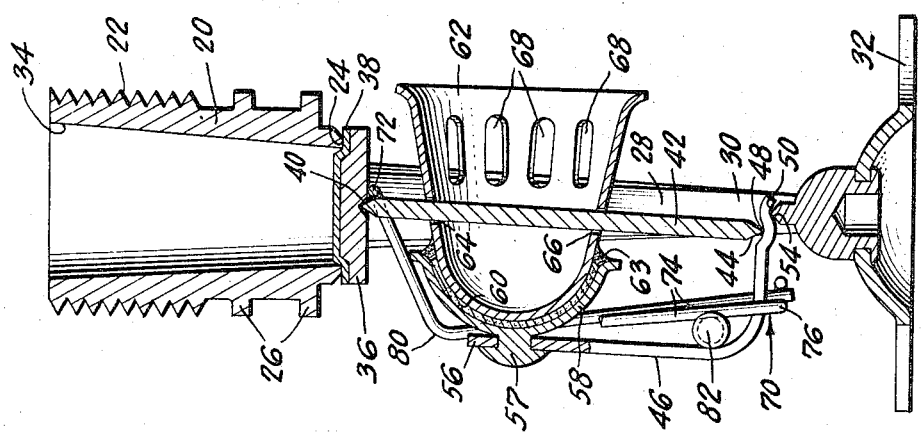
INVENTOR
JOHN R. YOUNG
BY Lane, Aitken, Dunner & Ziems
ATTORNEYS

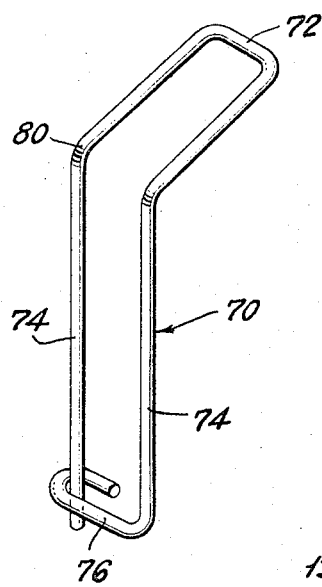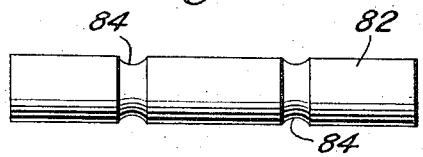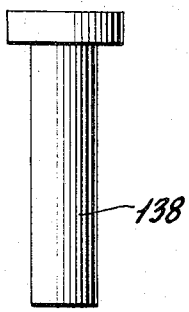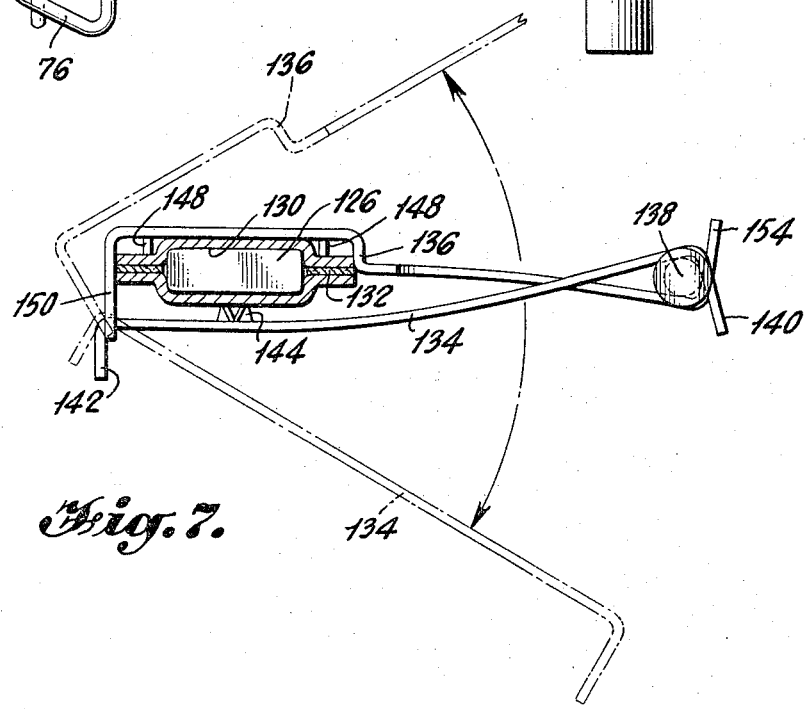

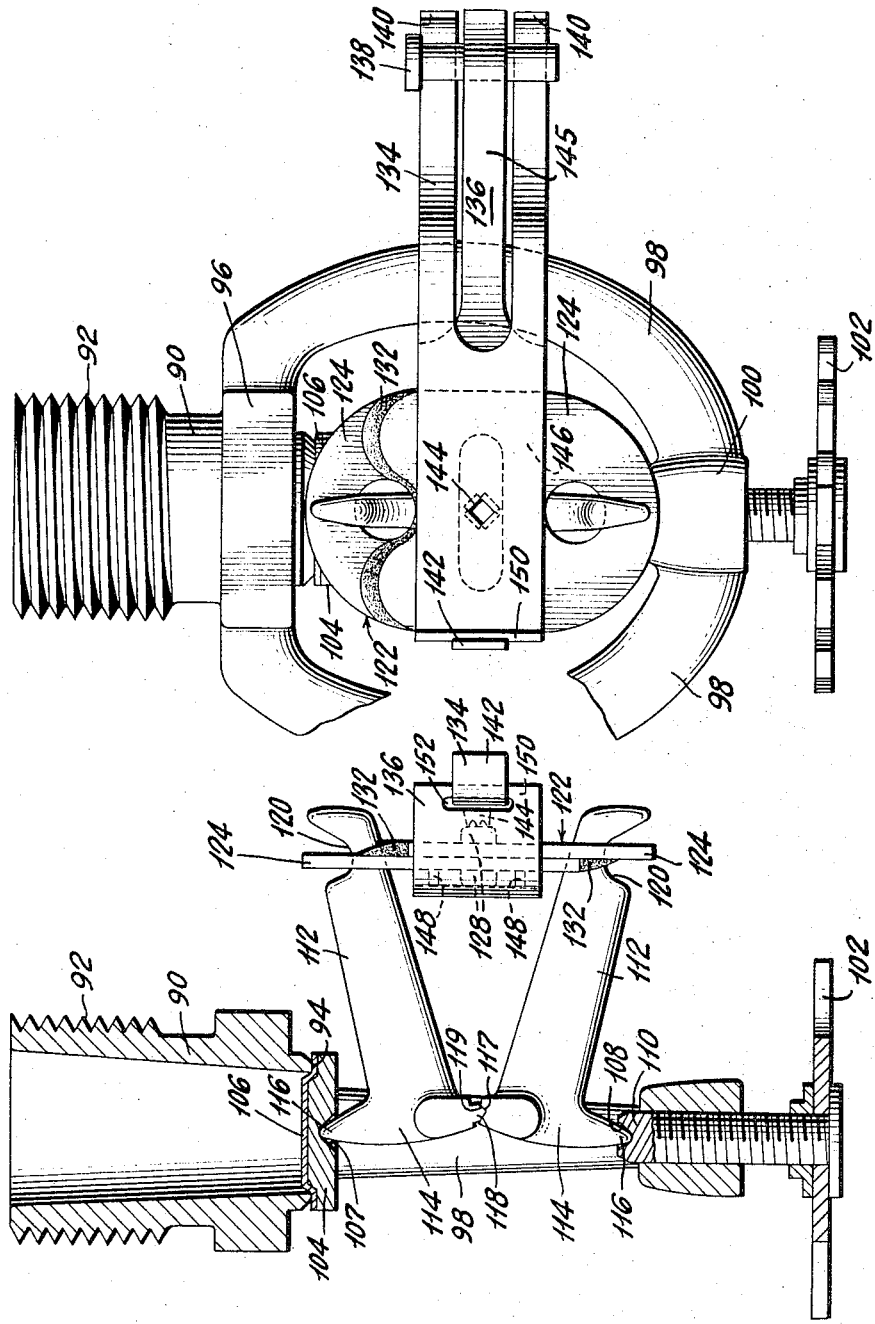

April 18, 1967 J. R. YOUNG 3,314,482
VALVE CONTROL MECHANISMS AND TECHNIQUES
Filed April 9, 1964 4 Sheets-Sheet 4
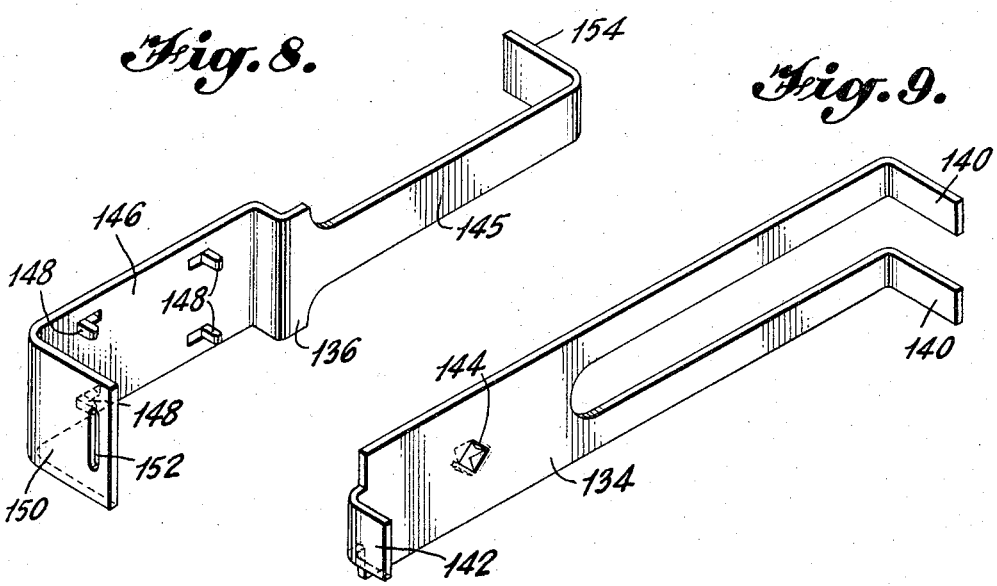
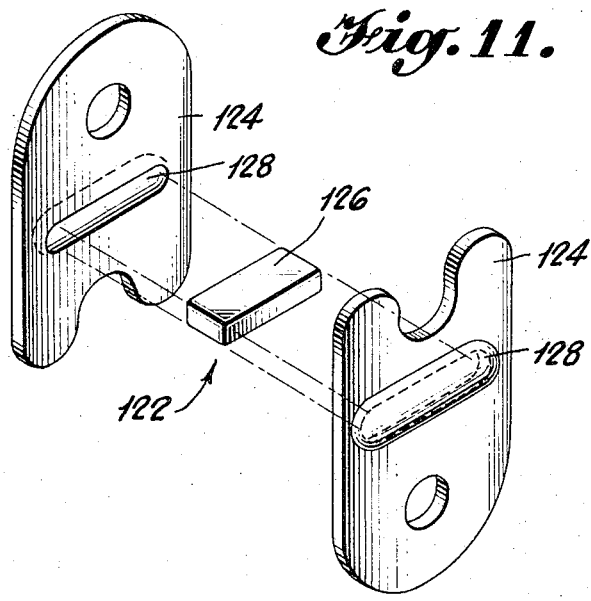
INVENTOR
JOHN R. YOUNG
BY *Lane, Aitken, Dunner & Ziems*
ATTORNEYS United States Patent Office 3,314,482
Patented Apr. 18, 1967

3,314,482
VALVE CONTROL MECHANISMS AND TECHNIQUES
John R. Young, Quincy, Mass., assignor to Factory Mutual Research Corporation, Norwood, Mass., a corporation of Massachusetts
Filed Apr. 9, 1964, Ser. No. 358,433
12 Claims. (Cl. 169—38)

This invention relates to valve control mechanisms and techniques and, more specifically, to thermally-responsive valve control mechanisms and techniques for their operation.

Valves which contain a mechanism which induces the valve to operate in response to a thermal condition are well known and take a great variety of forms. One area of use of such valves is, of course, that involving automatic sprinkler systems which are employed in the fire protection field.

In the conventional thermally-responsive valve utilized in such automatic sprinkler systems, the valve is maintained in closed condition, thus restraining a pressurized stream of water otherwise bearing against the valve, until such time as the control mechanism associated with the valve is exposed to a certain predetermined minimum temperature. Upon being exposed to such temperature, the thermally-responsive operating mechanism of the valve is actuated and the valve automatically opens, thus releasing the pressurized water previously restrained. This water is employed to fight the fire or the like heat from which caused the automatic sprinkler to open.

The thermally-responsive actuating mechanisms used in automatic sprinkler systems currently extant generally employ a fusible element such as solder whose melting temperature corresponds to the temperature at which it is desired to have the automatic sprinkler system operate, such temperature being known as the rated temperature of the sprinkler. In general, the rated temperature of the sprinkler is selected to provide a factor of safety designed to prevent premature operation of the sprinkler from gradual weakening of the thermally-responsive mechanism when exposed to elevated temperatures near the rated temperature of the sprinkler. For this reason, the rated temperature is normally selected so as to be about 25 or more degrees greater than the maximum temperature to which the sprinkler would be normally exposed under conventional non-fire conditions.

As a result of the nature of the structure of the conventional automatic sprinkler in use today, the rated temperature of a given sprinkler cannot be changed from a practical standpoint once the sprinkler has been installed. That is to say, because the thermally-responsive actuating mechanism is so intimately integrated with the other elements of the sprinkler, the temperature at which the sprinkler will open in response to a fire situation or the like cannot practically be changed short of replacement of the entire sprinkler and the substitution for such sprinkler of one with a higher rated temperature. This limitation on the use of automatic sprinkler systems has created significant difficulties in the past since it is not unusual for the conditions under which a given sprinkler system is employed to change sufficiently to require a sprinkler system of higher rated temperature than the one currently in use. Where such conditions change in the manner suggested, the inevitable choice made available to those charged with the decision has been between doing nothing or replacing the existing sprinklers with completely new sprinklers having higher rated temperatures. While the former choice has been obviously undesirable where the alternative would be the creation of a fire hazard, the latter choice, while often necessary to be made, is unpalatable due to the high replacement cost involved.

In accordance with the present invention, a novel means and technique have now been developed to permit the uprating of the operating temperature of an automatic sprinkler which eliminates the necessity for complete replacement of the existing sprinkler yet permits such uprating in an extremely economical and simple manner.

It is accordingly a primary object of the present invention to provide novel mechanisms and techniques for uprating the temperature at which a thermally-responsive valve will be caused to operate.

It is still another important object of the present invention to provide novel mechanisms and techniques for uprating the operating temperature of an automatic sprinkler in an economical and extremely simple manner.

It is a further object of the present invention to provide novel mechanisms and techniques for increasing the temperature at which an automatic sprinkler of the thermally-responsive type will open comprising supplementing the thermally-responsive means conventionally contained in said automatic sprinkler with a second thermally-responsive means which is responsive to a predetermined temperature greater than the temperature at which the first thermally-responsive means is responsive and which will maintain the sprinkler in closed position until said second predetermined temperature is reached.

It is still another important object of the present invention to provide novel mechanisms and techniques for uprating the temperature at which an automatic sprinkler will operate which essentially incorporates the use of a supplementary fusible element which fuses at a temperature higher than the primary fusible element normally incorporated in the sprinkler device, said supplementary fusible element being so constructed as to be capable of being applied to the sprinkler after the latter has been installed.

It is a further important object of the present invention to provide novel mechanisms and techniques for uprating the operating temperature of automatic sprinkler devices and which are particularly applicable to conventional sprinkler devices of the "link-and-lever" and "Duraspeed" types.

These and other important objects and advantages of the present invention will become more apparent in connection with the ensuing description and appended claims, as well as the attached drawings wherein:

FIG. 1 is a vertical axial sectional view of a Duraspeed" type of sprinkler device provided with means to uprate the operating temperature of the device;

FIG. 2 is a side elevation of the sprinkler device illustrated in FIG. 1;

FIG. 3 is a perspective of the spring element employed to uprate the operating temperature of the device illustrated in FIGS. 1 and 2, such spring element being shown without its associated solder pin;

FIG. 4 is an enlarged side elevation of a solder pin utilizable with the spring element illustrated in FIG. 3;

FIG. 5 is a vertical axial sectional view of a link-and-lever type of sprinkler device employing a scissors-like uprating mechanism in accordance with the present invention;

FIG. 6 is a side elevation of the sprinkler illustrated in FIG. 5;

FIG. 7 is a top plan view, partially in section of the scissors-like uprating mechanism and the link of FIGS. 5 and 6 with the "released" uprating mechanism shown in dot-and-dash lines;

FIGS. 8 and 9 are perspective views of the two portions of the scissors-like uprating mechanism of FIG. 7;

FIG. 10 is an enlarged side elevation of a solder pin useable in connection with the uprating mechanism of FIGS. 7–9; and FIG. 11 is an exploded perspective view of the link used in the device illustrated in FIGS. 5-7.

As previously indicated, the present invention involves novel mechanisms and techniques for uprating the temperature at which thermally-responsive valves, and in particular automatic sprinkler devices, are actuated. In its broadest aspects, such novel mechanisms and techniques involve the supplementing of the primary thermally-responsive means conventionally employed in the thermally-responsive valve or sprinkler device in question with a secondary or supplemental thermally-responsive means which is responsive to a predetermined temperature greater than the predetermined temperature at which the primary thermally-responsive means is operable and which will maintain the valve or sprinkler device in closed position until the second predetermined temperature is reached. In addition to this broad concept, the present invention contemplates more specific inventive concepts, including the provision of particular structural elements which are peculiarly well adapted to effect the broad objects of the present invention, as will be more particularly described hereafter.

While the broad inventive concepts of the present invention are not restricted to particular types of thermally-responsive valve mechanisms, the several inventions to which this application is directed can be best described in terms of specific automatic sprinkler devices which are currently in widespread use: the "Duraspeed" type sprinkler on the one hand and the "link-and-lever" type sprinkler on the other. As indicated, the first type of sprinkler and its associated uprating mechanism is illustrated in FIGS. 1-4; that of the link-and-lever type and its associated uprating mechanism is illustrated in FIGS. 5-11.

The basic "Duraspeed" type sprinkler in which an uprating mechanism within the contemplation of the present invention is incorporated is best illustrated in FIGS. 1 and 2. As shown therein, this sprinkler comprises a hollow stem 20 which is externally threaded at 22 for engagement with a source of fire extinguishing medium (such as water) and which terminates in a seat 24 which extends beyond squared portions 26 which are adapted to receive a wrench or the like. Extending from and attached to stem 20 are yoke arms 28, which are of channel cross-section throughout most of their curvature but whose terminal portions 30 evolve into a structure of ovate cross-section at the point of juncture of said yoke arms at a point near the deflector 32.

The throat 34 of stem 20 is normally maintained in closed condition by means of a shouldered disk valve 36. A thin washer 38 of copper or the like is positioned between valve 36 and seat 24. Disk valve 36 is provided with a depression 40 in which is received one end of a strut member 42. Strut member 42 extends substantially along but slightly off-set from the longitudinal axis of the sprinkler, the other end 44 of strut member 42 engaging one side of a spring element 46 in a crease 48 formed in the spring element. The other side of spring element 46 is provided with a crease 50 which is off-set from crease 48, crease 50 being in contact with a knife edge 54 on the yoke 28.

Spring element 46 is formed in a generally L-shaped manner with its end 56 being secured (as by a rivet 57) to a formed member 58, commonly called a "key," which is joined by means of a film of solder 60 or the like to a heat gatherer 62 which is, as shown in FIG. 1, of generally bell-shaped configuration. A film of wax 63 or the like covers the exposed surfaces of solder film 60. Heat gatherer 62 extends from key 58 to a point beyond the strut 42, said strut passing through opposed slots 64 and 66 in heat gatherer 62. As illustrated in FIG. 1, heat gatherer 62 is provided with perforations 68 which permit the heated air surrounding the sprinkler device to reach the inner surfaces of the device more readily and also to permit a continued flow of hot air through the interior of the heat gatherer 62.

As previously indicated, key 58 is attached to heat gatherer 62 by means of a fusible material such as a film of solder 60. When solder film 60 fuses, key 58 will be vigorously separated from heat gatherer 62 by virtue of the resilient action of spring element 46. As a result of such separation, a downward thrust will be exerted on strut 42, the dislodgement of which from between spring element 46 and disk valve 36 will result in the opening of the valve.

Thus far, what has been described is a conventional automatic sprinkler device of the "Duraspeed" type. Depending upon the temperature at which the film of solder 60 fuses, such automatic sprinkler will be operable at a higher or a lower temperature to conform with the needs of the environment in which the sprinkler is utilized. In accordance with the present invention, the rated temperature of such sprinkler may be increased by means of a supplementary uprating mechanism such as is illustrated in combination with the "Duraspeed" sprinkler in FIGS. 1 and 2 and separated therefrom in FIGS. 3 and 4 to more clearly illustrate the structural features of this mechanism.

As illustrated, an uprating mechanism generally designated at 70 comprises a generally L-shaped member one of whose ends 72 is closed and whose legs 74 terminate at its other end in a safety pin arrangement 76. The closed end 72 encircles the portion of strut 42 above heat gatherer 62. Uprating mechanism 70 extends away from the strut in the direction of spring element 46 and, at a point 80 near end 56 of spring element 46, reverses its direction back toward deflector 32. By means of a solder pin 82 wedged between the legs 74 of uprating mechanism 70 and spring element 46, the spring action of mechanism 70 urges it against key 58, as shown in FIGS. 1 and 2. As is clearly illustrated, solder pin 82 is provided with annular notches 84 to permit it to seat properly against the legs 74 of uprating mechanism 70.

By so selecting the material of solder pin 82 so that its melting point is higher than the melting point of solder film 60, it will be apparent that notwithstanding the fact that solder film 60 is subjected to a temperature at which it melts, the spring action of mechanism 70 exerted against key 58 will prevent the latter from separating from heat gatherer 62 so long as solder pin 82 is not subjected to its melting temperature. Thus, at a point above the melting temperature of solder film 60 but below the melting temperature of solder pin 82, disk valve 36 will remain seated on its seat 24 and the sprinkler will remain inoperative.

By way of example, it may be assumed that solder film 60 forming the primary thermally-responsive actuating means of the device may be rated at 165° F. By using a solder to form solder pin 82 comprising an alloy of bismuth and tin (50% of each by weight), the temperature at which the device will be actuated can be uprated to approximately 281° F.

Spring element 70 should, of course, be fabricated of a material which will not fuse at any temperature to which the sprinkler device will be normally subjected under operating conditions. A suitable material for this purpose is Phosphor bronze class "A" wire, 16 gauge (0.051″), "hard" temper.

As will be apparent from the very nature of the uprating mechanism 70, this structure can be readily applied to a "Duraspeed" or like type sprinkler on-the-site, notwithstanding the fact that the sprinkler has previously been installed. By virtue of the safety pin type terminal portion 76, mechanism 70 can be readily wrapped about the appropriate portions of the sprinkler and, once in its proper position, the terminal portions can be assembled within one another as more particularly illustrated in FIGS. 1 and 2.

A second type of sprinkler device illustrating the essential features of the present invention is shown in FIGS. 5-11 in the form of an uprating mechanism associated with a link-and-lever type of automatic sprinkler.

The basic link-and-lever type of sprinkler in connection with which the uprating mechanism of the present invention can be used is best illustrated in FIGS. 5 and 6. As shown therein, the sprinkler head comprises a hollow stem 90 which is externally threaded at 92 for engagement with a source of fire extinguishing medium such as water and which terminates in a seat 94 which extends beyond a squared portion 96 adapted to receive a wrench or the like. Extending from stem 90 are yoke arms 98 which merge at 100 and join a deflector 102 at that point.

The sprinkler head is normally maintained in closed position by a shouldered disk valve 104, a washer 106 of copper or the like being interposed between disk valve 104 and seat 94.

Centrally positioned on the surface of disk valve 104 is a hollow seat 107 lying along the longitudinal axis of the sprinkler head. Disposed opposite such hollow seat 107 and also along the longitudinal axis of the sprinkler head is a hollow seat 108 at the terminal portion of a boss 110 which extends inwardly towards the center of the sprinkler head from the juncture 100 of the yoke arms 98.

In order to retain disk valve 104 upon its seat 94 under the fluid pressure existing in the sprinkler system under non-operating conditions, suitable means are interposed for this purpose between the hollow seats 107 and 108. This means is so structured and arranged as to collapse suddenly to release the disk valve 104 upon the attainment of a predetermined temperature, the parts of the device being snapped clear of the main body of the structure when such temperature is attained.

Generally speaking, the means by which disk valve 104 is both maintained in position on its seat 94 and ultimately released upon the attainment of the rated temperature of the device comprises opposed levers 112 each of which is provided with a leg 114 having a pointed end 116 which seats in one or the other of hollow seat 107 or 108 as the case may be. The two levers 112 are releasably interlocked at juncture 117 by virtue of the positioning of projection 118 in recess 119, the point of juncture 118, however, being laterally off-set from the longitudinal axis of the device along which the pointed ends 116 of levers 112 are seated.

The outer ends of each of levers 112 are notched as at 120 and connected together by a link mechanism indicated generally at 122, the separation of the parts of which at the critical predetermined temperature permits the collapse of the levers and the unseating of disk valve 104 from its seat 94.

As best shown in FIG. 11, link 122 is a three-piece structure comprising two outer members 124 and a key member 126. Each of members 124 contains a depression 128 (which may be formed as by stamping or like technique) which, when said members are in abutting relation to one another as illustrated in FIG. 7, together form a keyway 130 in which key member 126 is positioned in the unactuated condition of the sprinkler head. As may clearly be seen in FIG. 7, a film of solder 132 fixes the three members of link 122 rigidly together in the position illustrated in the drawings before actuation of the device.

The link-and-lever device thus far described represents a conventional device which has seen widespread use to the present time. As is well known to those skilled in the art, when the device is subjected to a temperature at which solder film 132 fuses, members 124 of link 122 will separate from one another and permit levers 112, which are under stress in their assembled condition tending to separate them from one another, to themselves separate and to thus remove the restraining force from disk valve 104 so as to permit the sprinkler head to open.

In accordance with the present invention, the link-and-lever device described above may be uprated by means of an uprating mechanism such as is illustrated in position on the device in FIGS. 5 and 6 and separated therefrom in FIGS. 7-10. As shown in such figures of the drawings, the link-and-lever uprating mechanism is essentially comprised of three elements, the two scissor portions 134 and 136 and solder pin 138. Scissor portion 134 comprises a bifurcated spring element the bifurcations of which are bent over to form tabs 140 and which is provided at its base with a tab 142 extending in the same direction as tabs 140. As shown in FIG. 8, scissor portion 134 is provided with a stop 144 which projects outwardly from the flat surface of scissor portion 134 in a direction opposite to that in which tabs 140 and 142 extend.

Scissor portion 136 of the uprating mechanism (see FIG. 9) comprises a tongued element having a tongue 145 and a main body section 146 from which projects four stops 148. Extending outwardly from one end of section 146 in the same direction as stops 148 is a bent-over end portion 150 containing a slot 152. Extending outwardly from the end of tongue 145 in a direction opposite to end portion 150 is a tab 154.

As may readily be seen in FIG. 7, scissor portions 134 and 136 of the uprating mechanism described immediately above are adapted to be hinged together in scissor-like fashion about link 122. Thus, by inserting tab 142 through slot 152, scissor portions 134 and 136 may be moved toward and away from one another about the pivot point formed by the juncture of tab 142 and end portion 150. By wrapping the thus assembled scissor portions 134 and 136 about link 122 in the manner shown in FIG. 7 and by stressing the elements so that the tongue 145 of portion 136 passes through the opening between the bifurcations of portion 134 in scissor-like fashion, portions 134 and 136 can be locked together about link 122 by passing solder pin 138 between the two portions.

By so selecting the material of solder pin 138 that it melts at a higher temperature than solder film 132, it will be readily seen that though the sprinkler head is subjected to the temperature at which solder film 132 melts, the restraining force imposed upon link 122 by virtue of the uprating mechanism will prevent the elements of the link from separating from one another until such time as the fusion temperature of solder pin 138 is reached. At the latter point, the spring action of the stressed scissor portions 134 and 136 will cause them to separate from one another as shown in dot-and-dash lines in FIG. 7, releasing the restraining force on link 122 and permitting the sprinkler device to operate in its normal manner.

Quite obviously, the materials of which scissor portions 134 and 136 and solder pin 138 are constructed may be the same as the corresponding elements utilized to form the uprating mechanism in the "Duraspeed" type device previously described, though a particularly effective material for fabrication of scissor portions 134 and 136 is cartridge brass, 20 gauge B & S extra hard temper.

As will be understood, the novel mechanisms and techniques of the present invention make feasible the economical and simple conversion of existing thermally-responsive valve mechanisms to higher temperature ratings. The broad inventive concept is not, of course, limited to the uprating of such devices to any given temperature or temperature increment, the broad concept involved residing in the use of supplemental thermally-responsive means which is responsive to a predetermined temperature greater than the temperature to which the primary thermally-responsive means is responsive.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing de-

What is claimed is:

1. A method of increasing the temperature at which an automatic sprinkler will open, said automatic sprinkler being of the type comprising a valve and first thermally responsive means for maintaining said valve in closed position below a first predetermined temperature and for opening said valve at said first predetermined temperature, said method comprising supplementing said first thermally responsive means with a second thermally responsive means which is responsive to a second predetermined temperature greater than said first predetermined temperature and which will maintain said valve in closed position at and above said first predetermined temperature and until said second predetermined temperature is reached.

2. A method of increasing the temperature at which a valve will open, said valve being of the type which is operatively associated with first thermally responsive means for maintaining said valve in closed position below a first predetermined temperature and for opening said valve at said first predetermined temperature, said method comprising supplementing said first thermally responsive means with a second thermally responsive means which is responsive to a second predetermined temperature greater than said first predetermined temperature and which will maintain said valve in closed position at and above said first predetermined temperature and until said second predetermined temperature is reached.

3. A method of increasing the temperature at which an automatic sprinkler will open, said automatic sprinkler being of the type comprising a valve and first means including a first material which is fusible at a first predetermined temperature for maintaining said valve in closed position below said first predetermined temperature and for opening said valve at said first predetermined temperature through fusion of said first material, said method comprising supplementing said first means with second means including a second material which is fusible at a second predetermined temperature greater than said first predetermined temperature and which will maintain said valve in closed position at and above said first predetermined temperature and until said second predetermined temperature is reached, at which point said valve will open through fusion of said second material.

4. An automatic sprinkler device comprising a valve; closure means for maintaining said valve in closed position; actuating means associated with said closure means which exerts a first force on said closure means tending to maintain it in valve-closing relationship with said valve; means exerting a second force on said actuating means tending to remove said first force from said closure means and to urge said actuating means out of valve-closing relationship with said valve; first thermally responsive means for preventing said second-force-exerting means from urging said actuating means out of valve-closing relationship with said valve below a first predetermined temperature, at least a portion of said second force being exerted on said thermally responsive means; said first thermally responsive means being rendered inoperative from preventing said second force-exerting means from urging said actuating means out of valve-closing relationship with said valve at said first predetermined temperature; second thermally responsive means for preventing said second force-exerting means from urging said actuating means out of valve-closing relationship with said valve below a second predetermined temperature greater than said first predetermined temperature; said second thermally responsive means being rendered inoperative from preventing said second force-exerting means from urging said actuating means out of valve-closing relationship with said valve at said second predetermined temperature.

5. In an automatic sprinkler device of the thermally responsive type having a valve and first thermally responsive means for maintaining said valve in closed position below a first predetermined temperature and for opening said valve at said first predetermined temperature so as to open a path for fluid to flow through said valve; said first thermally responsive means including a fusible material which fuses at about said first predetermined temperature; the improvement comprising the combination with said first thermally responsive means of a second thermally responsive means for increasing the temperature at which said valve will open to a point above said first predetermined temperature; said second thermally responsive means including a fusible material which fuses at about said second predetermined temperature.

6. In a valve of the thermally responsive type which includes first thermally responsive means for maintaining said valve in closed position below a first predetermined temperature and for opening said valve at said first predetermined temperature so as to open a path for fluid to flow through said valve; said first thermally responsive means including a fusible material which fuses at about said first predetermined temperature; the improvement comprising the combination with said first thermally responsive means of a second thermally responsive means for increasing the temperature at which said valve will open to a point above said first predetermined temperature; said second thermally responsive means including a fusible material which fuses at about said second predetermined temperature.

7. An automatic sprinkler device comprising a valve; first thermally responsive means applying a force against said valve to maintain it in closed position below a first predetermined temperature but releasing said force at said first predetermined temperature; said first thermally responsive means including a fusible material which fuses at about said first predetermined temperature; and second thermally responsive means for applying a force against said valve to maintain it in closed position at a point above said first predetermined temperature until a second predetermined temperature is reached, at which point said last mentioned force will be released; said second thermally responsive means including a fusible material which fuses at about said second predetermined temperature.

8. An automatic sprinkler device as defined in claim 4 wherein said first thermally responsive means includes a fusible material which fuses at about said first predetermined temperature; and wherein said second thermally responsive means includes a fusible material which fuses at about said second predetermined temperature.

9. An automatic sprinkler device comprising a valve; first thermally responsive means applying a force against said valve to maintain it in closed position below a first predetermined temperature but releasing said force at said first predetermined temperature; and second thermally responsive means for applying a force against said valve to maintain it in closed position at a point above said first predetermined temperature until a second predetermined temperature is reached, at which point said last-mentioned force will be released; said second thermally responsive means including spring means which is stressed in its normal condition in said sprinkler device before said second predetermined temperature is reached; said second thermally responsive means further including a fusible material which fuses at about said second predetermined temperature and which maintains said spring means in said stressed condition, the fusion of said fusible material at said second predetermined temperature releasing the stress on said spring means.

10. A mechanism for uprating the temperature at which the valve of an automatic sprinkler device of the thermally-responsive type will open, said automatic sprinkler device comprising a valve and thermally responsive means applying a force against said valve to maintain it in closed position below a first predetermined temperature but releasing said force at said first predetermined temperature, said mechanism comprising:
(a) biasing means capable of being applied to said sprinkler device for applying a force against said valve to maintain the valve in closed position until said force is released; and
(b) supplemental thermally responsive means removably positioned in contact with said biasing means in a manner such that when said biasing means is applied to said sprinkler, the force applied by said biasing means will be applied to said valve, said last-mentioned force being released when the temperature of said supplemental thermally responsive means reaches a predetermined temperature higher than said first predetermined temperature.

11. An automatic sprinkler uprating mechanism as defined in claim 10 wherein said supplemental thermally responsive means is fusible at said predetermined higher temperature.

12. A method of increasing in situ the temperature at which an automatic sprinkler will open, said automatic sprinkler being of the type comprising a valve and a first thermally responsive means for maintaining said valve in closed position below a first predetermined temperature and for opening said valve at said first predetermined temperature, said method consisting essentially of supplementing said first thermally responsive means of an existing automatic sprinkler in situ with a second thermally responsive means which is responsive to a second predetermined temperature greater than said first predetermined temperature and which will maintain said valve in closed position at and above said first predetermined temperature and until said second predetermined temperature is reached, no further modification of such sprinkler or the hydraulic system in which said sprinkler is associated being effected for the purpose of increasing said temperature at which said sprinkler will open.

References Cited by the Examiner

UNITED STATES PATENTS

| | | | |
|---|---|---|---|
| 532,270 | 1/1885 | Esty | 169—39 |
| 768,676 | 8/1904 | McDaniel | 169—39 |
| 1,115,930 | 11/1914 | Hawkins | 169—39 |
| 1,182,773 | 5/1916 | Kleidmann | 169—39 |
| 1,193,619 | 8/1916 | Rowley | 169—39 |
| 1,578,770 | 3/1926 | Silva | 169—19 |
| 2,151,982 | 3/1939 | Loepsinger et al. | 169—39 |
| 2,414,127 | 1/1947 | Shaw | 251—11 |
| 3,080,143 | 3/1963 | Biermann et al. | 251—11 |

FOREIGN PATENTS 26,604  12/1904  Great Britain.

M. HENSON WOOD, Jr., *Primary Examiner.*

EVERETT W. KIRBY, *Examiner.*

EVON C. BLUNK, J. D. HUSSER, R. S. STROBEL,
*Assistant Examiners.*